Patented Jan. 5, 1943

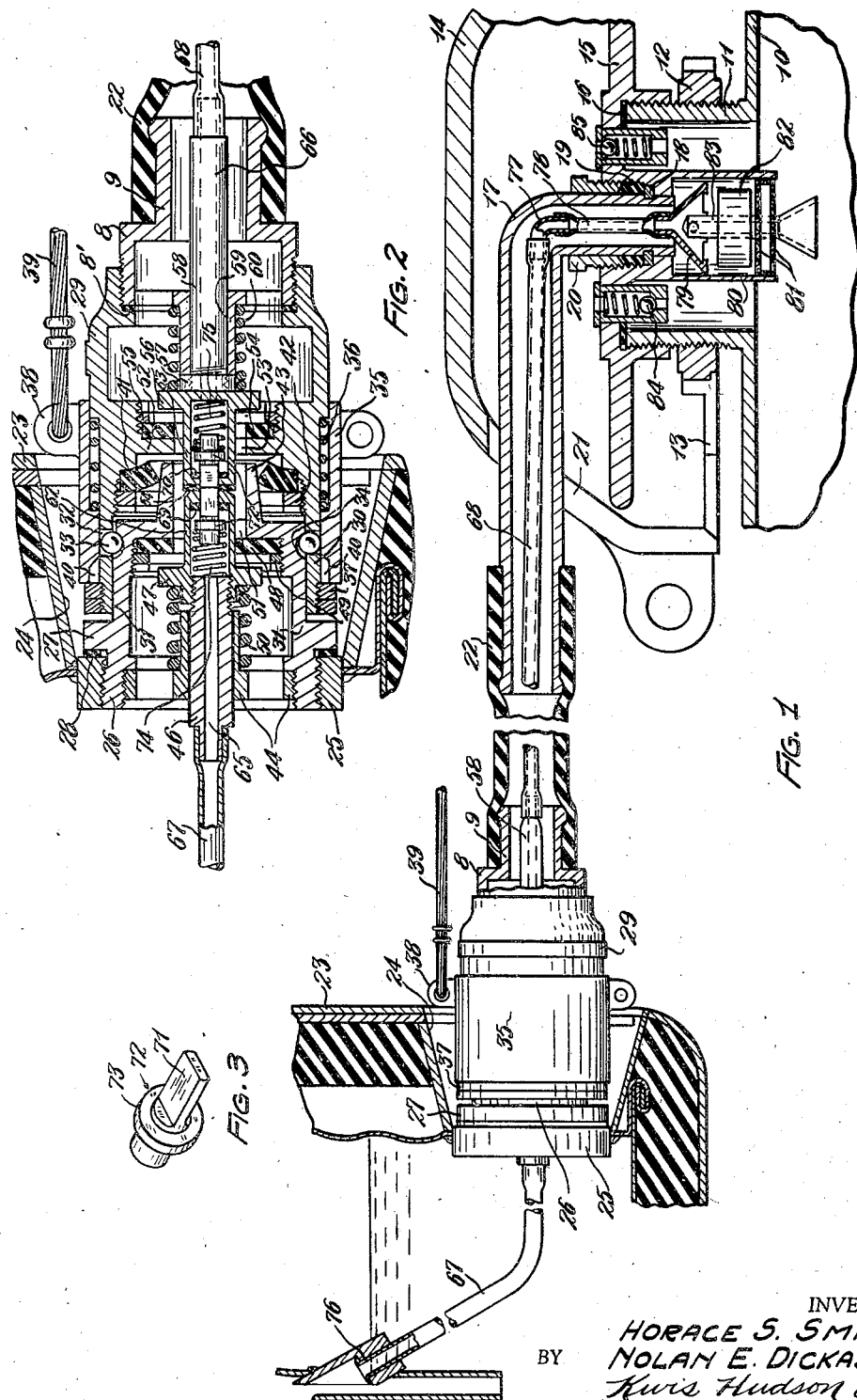

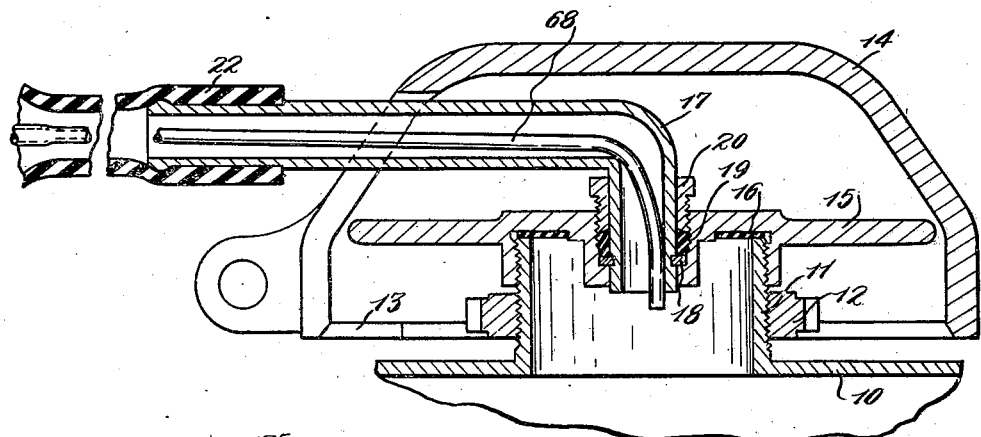
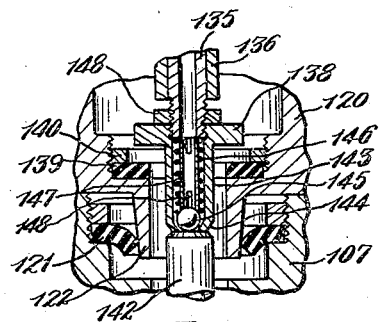
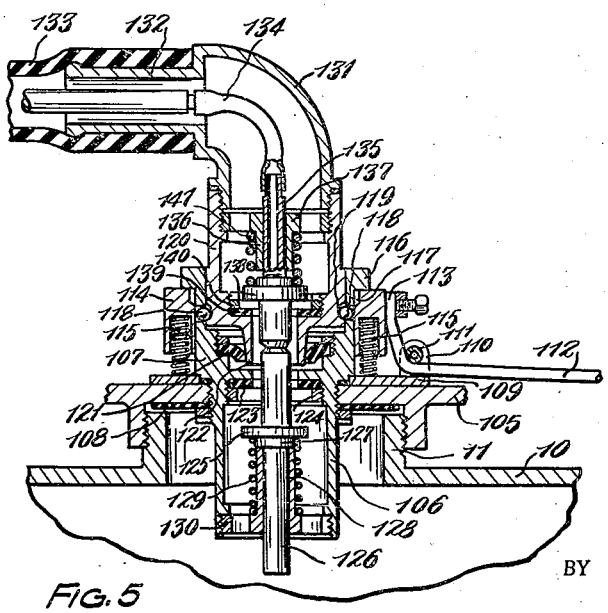
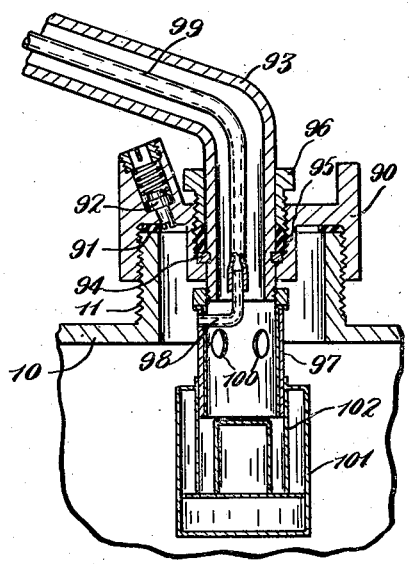

2,307,427

UNITED STATES PATENT OFFICE 2,307,427

FLUID CONDUCTOR

Horace S. Smith and Nolan E. Dickason, Kinsman, Ohio, assignors to The Glauber Brass Manufacturing Company, Kinsman, Ohio, a corporation of Ohio Application April 3, 1942, Serial No. 437,580

8 Claims. (Cl. 284—4)

This invention relates to improvements in fluid conductors. The invention is intended primarily for use in connecting an auxiliary fuel tank with the permanent fuel tank of a vehicle and embodies means, which may be operable from a relatively remote point, for separating the members of the union which forms part of the conductor, so that the auxiliary tank may be quickly jettisoned if desired. Also in order that a conductor of this kind may be quickly attached to or detached from a full tank without any loss of fuel we have devised valve means biased to closed position which cut off the flow of fuel from the tank, and preferably also valve means which interrupt the passage of air in a direction reverse to that of the intended fuel flow, which valve means is automatically operated when the members of the union are brought into operative relation to open the valve or valves. During the operation of vehicles such as Army tanks and armored cars the terrain traveled may be extremely rough and the main tank of the vehicle may assume various angles instead of its natural and intended position. A conductor attached to the main tank may then tend to fill up with fuel, producing flow in the reverse direction. Therefore in accordance with one phase of our invention we provide float means at the juncture between the main tank and the conductor for closing off that end of the conductor when fuel in the tank would tend to wash up and into the conductor.

An object of the invention is the provision of apparatus for carrying out the above purposes.

Other objects and features of novelty will appear as we proceed with the description of those embodiments of the invention which, for the purposes of the present application, we have illustrated in the accompanying drawings, in which Fig. 1 is an elevational view, largely in section, showing fragments of a permanent tank and an auxiliary tank connected together by our improved fluid conductor.

Fig. 2 is a central longitudinal sectional view on a larger scale of a union forming part of the conductor and showing the valve means opened for transmitting liquid in one direction and air in the opposite direction.

Fig. 3 is a perspective view of a valve piece which may be employed in connection with the air return.

Fig. 4 is a vertical sectional view of a modified form of connection between the main fuel tank and the conductor.

Fig. 5 is a vertical sectional view of a modified form of union placed at the main tank rather than at the auxiliary tank.

Fig. 6 is a fragmental view on a larger scale corresponding to a portion of the valve mechanism shown in Fig. 5, and Fig. 7 is a vertical sectional view showing another modification of the junction between the main tank and the conductor.

Referring to Figs. 1, 2 and 3 of the drawings, a fragment of a permanent fuel tank of a vehicle is illustrated at 10. It is provided with an upstanding neck 11 that is externally threaded to take first the hub 12 of a spider 13 which supports at its periphery an armored cover 14. The threaded union receives secondly a cap or the like 15 with a gasket 16 interposed to seal this opening in the tank.

A tubular angle arm 17 is oscillatably mounted in a bore in the center of the cap 11, being locked against movement axially by a split ring 18 which takes into an annular groove in the arm and is contacted on its upper side by packing 19 held in place by a gland nut 20 that is threaded into a counterbore of the cap.

The horizontal portion of the arm 17 extends outwardly through a cutout 21 in the cover 14, and its free end receives one extremity of a hose 22 which forms part of a liquid conductor and which is formed preferably of self-sealing rubber, so that if punctured by a bullet no liquid will escape. 23 represents a fragment of an auxiliary tank which is also formed partially of self-sealing rubber, for a similar purpose. In one end or one side of the auxiliary tank there is a discharge opening 24. To the tank surrounding this opening there is welded a ring 25 which is threaded internally to receive one of the principal members 26 of a union, on which there is a shoulder 27 that engages ring 25 through the intermediacy of a gasket 28. The other principal member 29 of the union has a cylindrical portion 30 which slides over a cylindrical portion 31 of member 26. The cylindrical portion 30 has a series of openings 32 therethrough which are slightly conical and in which are mounted steel balls 33, the openings 32 having an inner diameter slightly less than the diameter of the balls, thereby preventing them from moving radially inward out of the openings 32. When the parts are in normal connected relation, as illustrated in Fig. 2, balls 33 extend into an annular groove 34 in the cylindrical part 31 of member 26. Balls 33 are normally held against movement outwardly by a sleeve 35 which fits slidably upon a cylindrical surface of member 29 and is held normally in operative position over the balls 33 by means of a coil spring 36, its movement in response to spring 36 being limited by a stop ring 37 threaded onto member 29. The sleeve 35 is provided with one or more perforated ears 38, to one at least of which there is attached a cable 39 by means of which an operator may exert a pull in opposition to spring 36 for causing an internal groove 40 to move into registration with the openings 32, whereupon the balls 33 are free to move outwardly far enough to clear the groove 34. A continued pull, working through spring 36, may be communicated to member 29, causing balls 33 to be cammed outwardly and sliding the member 29 off the member 26. The outer end of member 29 is threaded internally to receive a fitting 8 with a nipple 9 over which the hose 22 is mounted. A gasket 8' seals the joint between member 29 and fitting 8.

When the two members 26 and 29 are brought into operative relation, as shown, the joint between them is sealed by means of an annular gasket 41 which is held between an internal shouldered socket in member 29 and a ring 42 threaded into place against the gasket. The radially inner edge of the latter contacts and bears against the tapered outer surface of a constricted part 43 of member 26.

In each of the members 26 and 29 we provide valve means which are so constructed that they close off the liquid passage in each member automatically when the two members are separated and open each of these passages when the members are brought together and locked in operative relation. While we consider it highly desirable that both of the union members have automatically operative valves of this character, it will be appreciated that such a valve in one member only may be employed if desired without departing from the spirit of the invention. A spider 44 is threaded into the outer end of member 26. A cylindrical projection 45 on the hub of the spider extends inwardly for a distance, and this extension, as well as the spider hub, are bored out to receive a cylindrical slide 46 upon the threaded inner extremity of which is mounted a valve piece 47. This valve piece is adapted to seat against an annular gasket 48 which is held by a theraded ring 49 against a flat surface of member 26, the valve piece being biased toward closed position by a coil spring 50 which bears at one end against the hub of spider 44 and at the other end against the rear side of valve piece 47. It will be observed that when the valve piece 47 is off its seat liquid is free to pass through the openings in spider 44, through the space around the spring 50, around the periphery of valve piece 47, through the central opening in gasket 48 and through a bore 51 in the constricted part 43 of member 26.

Outwardly of gasket 41 member 29 has a wall 52 which extends radially inward but has a central opening 53 of the same size as the bore 51 of member 26. On the outer side of this wall there is an annular gasket 54 held in place by a threaded ring 55, the hole through this gasket being flush with the opening 53. Gasket 54 forms a seat for a valve piece 56 which has a neck 57 that is threaded onto one end of a cylindrical slide 58 that is mounted within a guiding bore in a hub portion 59 of the fitting 8. The valve piece 56 is biased toward closed position by a coil spring 60 which bears at one end against the fitting 8 and at the other end against the valve piece 56. The degree to which the valve may be opened is limited by the engagement of the neck 57 with the inner end of hub 59.

The valve piece 47 is provided with an inwardly extending nose 62 which projects through the gasket 48 into the bore 51. Valve piece 56 has a similar nose 63 which extends through its seat and engages the nose 62 when the members of the union are assembled in operative relation. An annular gasket 64 may be carried on the extremity of nose 63 to seal the joint between the two noses. Before the two members of the union are brought together springs 50 and 60 will hold both liquid valves closed against their seats. When the members are assembled in operative relation, however, these two noses engage each other and both valves are unseated. The spring 50 is stronger than the spring 60, however, so that the valve piece 47 rests against its seat until the valve piece 56 reaches its limit of movement, after which the valve piece 47 is shifted away from its closed position. Conversely, when the union is broken the valve piece 47 is the first to be seated. When a liquid valve is not required in one of the union members, as for example in member 29, the nose 63 may be made rigid. When the members 26, 29 are brought together the movable nose 62 will then be pushed back by the fixed nose 63, unseating valve piece 47.

In order that air may be discharge from the top of tank 10 at the same time that liquid flows into the tank, we provide a conductor for air or other gas, locating it within the conductor 22 and the two members of the union 26, 29. This conductor comprises axial passages 65 and 66 through the slides 46 and 58, respectively, through the hollow nose pieces 62 and 63 of the liquid valves and through flexible, small diameter tubes 67 and 68 which are mounted on the reduced outer extremities of the slides 46 and 58. These tubes, like the hose 22, are preferably formed of artificial rubber which resists chemical action by the usual motor fuels better than natural rubber.

On the inner wall surfaces at the ends of the two hollow noses 62 and 63 there are annular gaskets 69 and 70 which surround circular axial holes in the ends of the noses through which air or other gas may pass in traveling from one union member to the other. These circular holes are filled only partially by flat projections 71 on two identical valve pieces 72 (Fig. 3) which have disk shaped portions 73 that are adapted to seat against the gaskets 69 or 70 as the case may be.

Coil springs 74 and 75 tend to force the valve pieces 72 against their seats, but yield to unseat the valve pieces when the two flat projections 71 engage each other at the time the union members are assembled together. The springs 74 and 75 are weak, as compared with the springs 50 and 60, and consequently the fluid conductors remain connected until after both liquid valves close. It will be understood also that one of the fluid valves may be eliminated, the extension 71 in that case engaging a fixed part of the nose of the other member when the two members are brought together into operative relation.

The end of fluid conductor 67 which is remote from the union 26, 29 is supported in the tank 23 above the liquid level thereof, as indicated at 76. The outer end of conductor 68 is attached to a small metal elbow 77 to which a short length of similar tubing 78 is connected. The lower end of the latter is mounted upon the tubular upper end of a cone shaped shutter 79 which is guided within a float mounting 80 preferably formed integral with the cap 15. The shutter 79 is adapted when raised to close the lower end of the hollow conductor arm 17. At the bottom of the mounting 80 there are two spaced wire mesh flame arrestors 81. Above the latter a float 82 carries a light weight post 83 with a conical upper end adapted to close the opening through the tubular upper end of shutter 79. Thus as liquid rises in the tank 10 and tends to fill the space within the neck 11 and to flow into the conductor joining the two tanks, as it might do for example when the vehicle was traveling on a heavy down grade, the lifting of float 82 will act first to cause post 83 to close the fluid passage and thereafter to cause shutter 79 to close the liquid passage.

We also maintain pressure conditions within the tank 10 between predetermined limits by mounting in the cap 15 two reversely operating ball check valves 84 and 85, valve 84 opening to relieve excess pressure and valve 85 opening to admit atmospheric air in the event that vacuum conditions are encountered within the tank. The construction and operation of these valves will be apparent from an inspection of Fig. 1 of the drawings, it being noted that the two constructions have identical parts, thereby reducing costs.

Assuming that the tank 23 is filled with fuel and that the member 26 of the union is fixed in the tank as herein illustrated, the valve 47, 48 being closed, and assuming that it is desired to connect the tank 23 with the tank 10, the latter having concentric liquid and fluid conductors connected thereto in the manner illustrated, the operator brings the union member 29 into juxtaposition with the member 26 and pulls back the sleeve 35, either directly or through the cable 39, thereby bringing the groove 40 into registry with the openings 32. He then slides the member 29 over the member 26 until one or more of the balls 33 enter the groove 34. The operator then releases the sleeve 35 which advances by reason of the action of spring 36, and forces the remaining balls 33 into the groove 34, thereby locking the two members 26 and 29 together. This assembly of the two members causes the gasket 41 to be flexed to seal the joint between the members. During this assembly of the members 26, 29 the first effect is that the projections 71 of valves 72 engage each other to open the fluid valves and set up a continuous fluid passage. Then the noses 62 and 63 engage each other and the valve 56 is unseated until the neck 57 engages the hub 59, after which further pressure exerted by the operator compresses spring 50 and opens valve 47. Shortly thereafter the members of the union are locked together as previously described. When the union is to be broken a pull may be exerted upon the cable 39 from a more or less remote point. This brings groove 40 into registry with balls 33, whereupon spring 50 causes nose 62 to push against nose 63 effecting some movement of separation between the members 26 and 29. The valve 47 is then closed and the exit for liquid from tank 23 is cut off. Then the spring 60 causes nose 63 to push against nose 62, effecting further separation of the union members. Thereafter the member 29 will fall away from member 26 by its own weight or by a slight additional pull on cable 39, and when this occurs the two fluid valves 72 will close.

Fig. 4 shows a simplified form of connection at the main tank end of the conductors, that is with the float controlled shutter and air valve omitted. In this construction we depend entirely upon the liquid and air valves in the union member 29 for cutting off the discharge of liquid from the tank 10.

Fig. 7 shows a modified form of float control at the main tank end of the apparatus. In this modification the neck 11 of the tank is closed by a threaded cap 90 provided with a gasket 91, the cap having therein a pressure exhausting check valve 92, similar in function to the ball valve 84 previously described. A hollow arm 93 forming a portion of the liquid conductor is mounted in a central bore of cap 90 to swing about a vertical axis, being held against withdrawal by a split ring 94, and the swing joint being sealed by packing 95 held in place by a gland nut 96. A cylindrical float mounting 97 depends from the lower end of arm 93, being attached preferably by a threaded connection as shown. A small metal elbow 98 has one end mounted in a perforation in the side of the mounting while its upwardly extending end receives the lower extremity of a flexible fluid conductor 99. There are also ports 100 through the side walls of the mounting. A float 101 hangs from the mounting 97 and is capable of rising from the illustrated position under the buoyant effect of liquid in the tank, causing an inner cylindrical wall 102 to close off the ports 100 and thereafter the passage through the elbow 98.

In Figs. 5 and 6 there is illustrated a modification of our union designed for mounting at the main tank rather than at the auxiliary tank, in which case of course the hose connections for liquid and air would remain with the auxiliary tank. In this modification the union is assembled upon a cap 105 which may be threaded onto the neck 11 of the tank 10. The fixed member of the union has a small diameter part 106 which is threaded into the cap 105 and projects downwardly into the tank. The larger diameter portion 107 rests upon the top of the cap. A gasket 108 is provided for sealing the joint between the tank and cap and between the cap and the small diameter portion 106 of the fixed member.

On the upper side of the cap there is mounted a plate 109 which is provided with an upstanding arm 110 on which there is a cable guide 111. A cable 112 extends under this guide and is attached at 113 to a sleeve 114 which is urged upwardly by springs 115 against a stop consisting of a flange 116 at the upper end of member 107. This sleeve 114 has a groove 117, similar to the groove 40, for registration with openings of member 107, wherein balls 118 are mounted. The balls normally extend into an annular groove 119 formed in the retractible member 120 of the union. The joint between the two members of the union is sealed by an annular gasket 121 carried by member 107 and bearing against a tapered surface on a small diameter end portion 122 of member 120, these parts being similar to the corresponding parts 41 and 43 of the first described form of the invention.

A seat for the liquid valve in the member 106, 107 is provided by an annular gasket 123 held in place by a threaded ring 124. Cooperating with this seat there is a disk valve 125 carried by a hollow valve stem 126 upon which there is a collar 127 which is adapted to engage the upper end of a slide guide 128 and limit the downward movement of the valve and its stem. A coil spring 129 tends to lift the valve and press it against the seat 123. The guide 128 is integral with a perforated plate 130 which is threaded into the lower end of the small diameter part 106 of the fixed member of the union.

The upper end of member 120 is threaded to receive an elbow 131 which carries a nipple 132 that is adapted to receive a flexible hose 133 like the hose 22 of the first described form and constituting a liquid conductor. An air or other gas conductor 134 is carried within the hose 133 and elbow 131 and consists preferably of a synthetic rubber tube like the tube 67, 68 of the first form of the invention. This tube is connected with a small tubular metal slide 135 carried by a cylindrical guide 136 integral with a perforated plate 137 that is threaded into member 120.

On the lower threaded end of slide 135 there is mounted a disk valve 138 which is adapted to seat against an annular gasket 139 held in place by a threaded ring 140, the valve being urged toward closed position by a coil spring 141. When the union is broken the two liquid valve pieces 125 and 138 will advance to their seats automatically in the same manner as in corresponding valve pieces 56 and 47 previously described. The spring 141 is stronger than spring 129 and consequently valve 138 will close first. It will open last when the union members are assembled.

When the two members 120 and 106, 107 are assembled together air may flow in either direction between the tank and tube 134, through the hollow stem 126 and tubular slide 135. Preferably we provide fluid valves in each of the two members for cutting off fluid flow. These valves function like the valves 72 of the first described form of the invention, but as herein illustrated they differ somewhat in detail construction. As they are identical one only is illustrated. The liquid valves 125 and 138 have hollow nose pieces 142 and 143 which project through their respective seats 123 and 139 and meet to unseat the valves. The meeting ends of these nose pieces are toed in, as shown at 144 in Fig. 6, whereby a conical seat is provided for each ball 145. Each of the latter is urged towards its seat by a coil spring 146 that surrounds and is guided by a thin walled tubular extension 147 of the slide 135. Slots 148 are cut through the extension 147.

When the two members 120 and 106, 107 are brought into operative relation the two balls 145 contact each other and open against the force of their springs 146, and air is free to flow through the fluid conductors but when the members are separated these ball valves immediately close in the same manner as in the case of the corresponding valves of the first described form of the invention.

Having thus described our invention, we claim:

1. In apparatus of the character described, a union comprising two connector members meeting endwise, a valve in one of said members, a flexible hose upon which the second member is mounted, means for locking the union members in operative position comprising a sleeve slidable on said second member, spring means tending to close said valve and separate said members, means for opening said valve against the action of said spring when the members are brought into operative position, and actuating means carried by the second member and extending to a remote point for moving said sleeve to release said locking means thereby permitting said spring means to separate said members and close said valve.

2. In apparatus of the character described, a union comprising two connector members meeting endwise, one of said members being arranged for mounting in a tank, a flexible hose upon which the second member is mounted, a valve in each of said members, means for locking said members in connected relation comprising a sleeve slidable upon said second member, spring means in each of said members tending to close the respective valves, said valves comprising portions which interengage to unseat the valves when the members of the union are brought together in operative relation, and means carried by the second member and operable from a remote point for moving said sleeve to release said locking means thereby permitting said spring means acting through said valves to separate said members and close the respective valves.

3. In apparatus of the character described, a union comprising two connector members meeting endwise, said members each having a liquid passage and a concentric gas passage, one of said members having valve means adapted to close the liquid passage and valve means adapted to close the gas passage, both of said valves being biased toward closing position, means for opening both of said valves when the members of the union are brought into operative relation, and means for locking the union members in operative relation.

4. In apparatus of the character described, a union comprising two connector members meeting endwise, said members each having a liquid passage and a concentric gas passage, one of said members having valve means adapted to close the liquid passage and valve means adapted to close the gas passage, both of said valves being biased toward closing position, means for opening both of said valves when the members of the union are brought into operative relation, means for locking the union members in operative relation, and means operable from a remote point for releasing said locking means thereby permitting said members to separate and said valves to close.

5. In apparatus of the character described, a union comprising two connector members meeting endwise, said members each having a liquid passage, a valve in one member biased to close said liquid passage, each of said members having a fluid conductor located concentrically within its liquid passage, the valve piece of said liquid valve constituting a portion of the fluid conductor of one member, the valve piece of said liquid valve having a nose projecting through its valve seat, and a fluid valve in said nose comprising a valve piece projecting through and beyond said nose, and means comprising the fluid conductor of the other member adapted when the two members are brought together into operative relation to unseat first the said fluid valve piece and thereafter the said liquid valve piece.

6. In apparatus of the character described, a union comprising two connector members meeting endwise, a valve in each of said members, means for locking said members together in connected relation, and a spring in each of said members tending to close the valve of that member, said valves comprising portions which interengage to unseat the valves when the members of the union are brought together in operative relation, the spring of one of said members being stronger than the spring of the other member, and an abutment to limit the extent to which the valve of the latter member may be opened.

7. In apparatus of the character described, a union comprising two connector members meeting endwise, each of said members having a liquid passage, a valve in each member biased to close its liquid passage, each of said members having a fluid conductor located concentrically within its liquid passage, the valve pieces of each of said liquid valves constituting a portion of the fluid conductor of the corresponding member, the valve piece of each of said liquid valves having a nose projecting through its valve seat, and a fluid valve in each of said noses comprising a valve piece projecting through and beyond the nose, the valves being so arranged that when the two members are brought together into operative relation the valve pieces of the fluid valves engage each other, opening those valves, after which the said noses engage each other, opening the liquid valves.

8. In apparatus of the class described, a disconnectable union for the bottom of a liquid tank, one member of said union being arranged for mounting in the tank, an annular valve seat in said member, a hollow valve stem, an annular valve piece carried thereby, spring means tending to close said valve, said stem projecting through said annular seat and having an annular valve seat in its nose, and a valve piece in said hollow stem biased toward engagement with said last named seat and having a projection extending therethrough, whereby both of said valves may be opened by pressure directed toward the nose of said valve stem.

HORACE S. SMITH.
NOLAN F. DICKASON.

DISCLAIMER 2,307,427.—*Horace S. Smith* and *Nolan E. Dickason*, Kinsman, Ohio. FLUID CONDUCTOR. Patent dated Jan. 5, 1943. Disclaimer filed Feb. 16, 1945, by the assignee, *L. W. Vizay Corporation*.

Hereby enters this disclaimer to claims 3, 4, and 6 of said patent.

[*Official Gazette March 27, 1945.*]